United States Patent Office 3,278,548
Patented Oct. 11, 1966

3,278,548
WATER-SOLUBLE PHTHALOCYANINE
DYESTUFFS
Rudolf Kühne, Fritz Meininger, and Hartmut Springer, Frankfurt am Main, Germany, assignors to Farbwerke Hoechst Aktiengesellschaft vormals Meister Lucius & Brüning, Frankfurt am Main, Germany, a corporation of Germany
No Drawing. Filed Oct. 6, 1964, Ser. No. 401,976
Claims priority, application Germany, Oct. 11, 1963,
F 40,964
6 Claims. (Cl. 260—314.5)

The present invention relates to novel valuable water-soluble phthalocyanine dyestuffs and to a process for preparing them; more particularly the invention relates to dyestuffs of the general formula

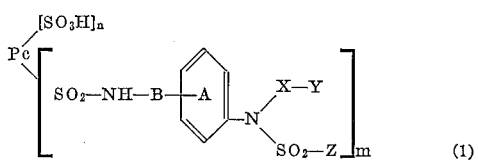  (1)

in which Pc represents a substituted or unsubstituted metal-containing phthalocyanine nucleus, B represents a direct linkage or a bivalent organic radical, X stands for a straight chain or branched alkyl radical having 1 to 4 carbon atoms, Y represents a halogen atom or a substituent containing oxygen, nitrogen or sulfur, Z represents the grouping

  (2)

or

  (3)

in which $R_1$ represents a hydrogen atom or an alkyl group having 1 to 5 carbon atoms and $R_2$ an inorganic or organic acid radical and in which $m$ stands for a number of 1 to 4 and $n$ for a number of 0 to 3, the sum of $m$ and $n$ being at most 4, and the benzene nucleus A may contain further substituents.

It has now been found that novel valuable water-soluble phthalocyanine dyestuffs of the general formula

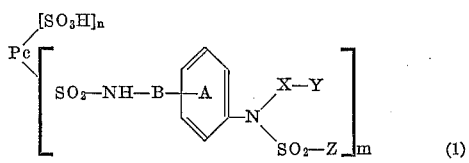  (1)

in which Pc represents a substituted or unsubstituted metal-containing phthalocyanine nucleus, B represents a direct linkage or a bivalent organic radical, X stands for a straight chain or branched alkyl radical having 1 to 4 carbon atoms, Y represents a halogen atom or a substituent containing oxygen, nitrogen, or sulfur, Z represents the grouping

  (2)

or

  (3)

in which $R_1$ represents a hydrogen atom or an alkyl group having 1 to 5 carbon atoms and $R_2$ an inorganic or organic acid radical and in which $m$ stands for a number of 1 to 4 and $n$ for a number of 0 to 3, the sum of $m$ and $n$ being at most 4, and the benzene nucleus A may contain further substituents can be obtained by condensing phthalocyanine sulfochlorides with amines of the general formula

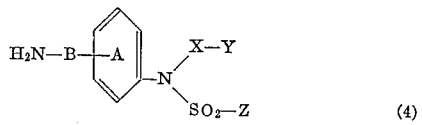  (4)

in which A, B, X, Y and Z have the meanings given above, Z representing additionally the grouping

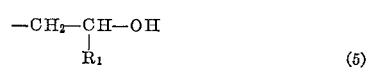  (5)

in which $R_1$ has the meaning given above and by (a) isolating the dyestuffs containing groupings of Formula 3.

(b) isolating the dyestuffs containing groupings of Formula 2 or by transforming said dyestuffs into dyestuffs into dyestuffs having groupings of Formula 3 by treating them with acid-binding agents, for example with sodium carbonate or with sodium hydroxide or (c) transforming the dyestuffs containing groupings of Formula 5 first into dyestuffs having groupings of Formula 2 by treating them with inorganic or organic acids or their derivatives for example sulfuric acid, by isolating the dyestuffs having groupings of Formula 2 or by transforming them into dyestuffs containing groupings of Formula 3 by treating them with acid-binding agents, for example with sodium carbonate or sodium hydroxide.

As bivalent organic radical B there may be mentioned for example groupings of the formulae

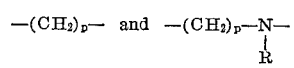

in which $p$ represents a whole number of 1 to 5 and R a hydrogen atom or an alkyl group having 1 to 5 carbon atoms and the following groupings:

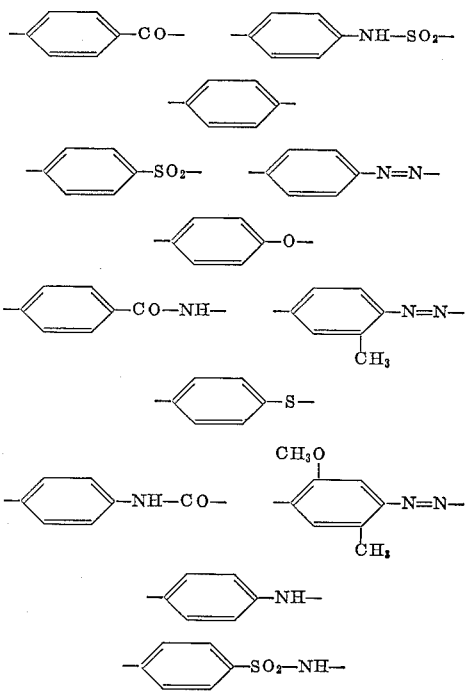

As substituents Y containing oxygen, nitrogen and sulfur there may be mentioned for example —OH, —CN, —O—SO₃H, —SO₃H, —COOH, —COO-alkyl,

—SO₂-alkyl, —CO—NH₂, —O-alkyl or —N(alkyl)₂ groupings. As inorganic and organic acid radicals $R_2$ there may be mentioned for example the radicals —O—SO₃H, —O—CO—CH₃ and the halogens.

Phthalocyanine sulfochlorides which may be used as starting material according to the process of the present invention are for example: di-, tri- or tetrasulfochlorides of metal containing phthalocyanines, for example copper phthalocyanine-(3)-tetrasulfochloride, copper phthalocyanine-(4)-tetrasulfochloride, copper phthalocyanine-(3)-trisulfochloride, cobalt phthalocyanine-(3)-trisulfochloride or nickel phthalocyanine-3-tetrasulfochloride. There are, however, also be used sulfochlorides carrying further substituents at the phthalocyanine nucleus, for example sulfochlorides of tetraphenyl copper phthalocyanine or of tetrachloro nickel phthalocyanine or for example copper phthalocyanine-(3)-disulfochloride disulfonic acid. These sulfochlorides are prepared according to known processes for example according to the process described in German patent specification 891,121.

As amines of the general Formula 4 which may be applied according to the process of the present invention there may be mentioned for example the following compounds which may be used, if desired, in the form of their alkali salts:

3-(N-β-cyanethyl-N-ethionylamino)-1-aminobenzene,
4-(N-β-cyanethyl-N-ethionylamino)-1-aminobenzene,
3-(N-β-cyanethyl-N-ethionylamino)-4-methoxy-1-aminobenzene,
5-(N-β-chlorethyl-N-ethionylamino)-2-methyl-1-aminobenzene,
3-(N-β-chlorethyl-N-β'-chlorethylsulfonylamino)-1-aminobenzene,
4-(N-β-chlorethyl-N-β'-chlorethylsulfonylamino)-1-aminobenzene,
3-(N-β-cyanethyl-N-vinylsulfonylamino)-1-aminobenzene,
3-(N-β-carboxyethyl-N-ethionylamino)-1-aminobenzene,
3-(N-β-carbethoxy-ethyl-N-ethionylamino)-1-aminobenzene
4-(N-carbethoxy-methyl-N-ethionylamino)-1-aminobenzene,
5-(N-β-cyanethyl-N-ethionylamino)-2-chloro-1-aminobenzene,
4-(N-β-cyanethyl-N-ethionylamino)-6-amino-1,3-dimethylbenzene,
4-(N-β-cyanethyl-N-ethionylamino)-2-amino-1,3-dimethylbenzene,
3-(N-β-hydroxyethyl-N-ethionylamino)-1-aminobenzene,
3-(N-β-hydroxyethyl-N-isethionylamino)-1-aminobenzene-disulfuric acid ester,
4-(N-carbomethoxy-methyl-N-ethionylamino)-1-(4'-aminobenzoylamino)-benzene, of the formula

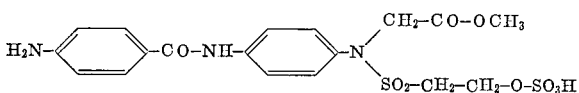

or 3-(N-β-cyanethyl-N-ethionylamino)-2'-methyl-4'-amino-1,1'-azobenzene of the formula

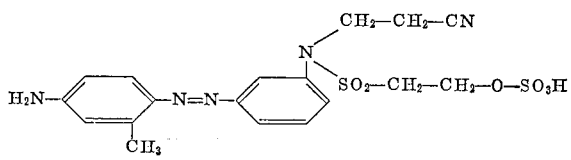

Furthermore, suitable amines of the general Formula 4 are those of the compounds mentioned above that contain an N-isethionylamino group instead of the N-ethionylamino group.

The amines of the general Formula 4 being used as starting material may be prepared for example by reacting nitrocompounds of the general formula

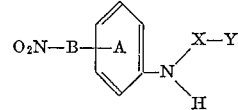

in which A, B, X and Y have the meanings given above with acylating agents for example with vinyl sulfonic acid chloride, β-chlorethane sulfonic acid chloride or carbylsulfate and by subsequently reducing the nitro group to the amino group. The starting compounds of Formula 4 containing as grouping Z the group of the formula

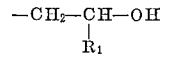

can easily be prepared by hydrolizing the amines of Formula 4 containing the grouping of Formula 2 in an acid medium.

The phthalocyanine sulfochlorides can be reacted with the amines of the general Formula 4 according to the process of the present invention in an aqueous or non-aqueous medium, in solution or in suspension according to the solubility properties, in the presence of acid-binding agents. For carrying out the reaction in a non-aqueous medium there may be used as solvents for example, methanol or dimethyl formamide. Sodium bicarbonate, sodium carbonate or sodium hydroxide or tertiary organic bases, for example pyridine or triethyl amine may be used for example as acid-binding agents. The reaction is carried out with weakly acid to weakly alkaline pH-values within a wide temperature limit. Temperatures within the range of about —5° and +60° C. are advantageously applied.

The starting compounds are advantageously chosen in a manner such that the phthalocyanine dyestuff formed contains the number of solubilizing groups for example sulfonic acid groups and/or carboxylic acid groups necessary for attaining sufficient solubility in water. If for example the amine of the general Formula 4 to be reacted does not contain any solubilizing groups, the phthalocyanine sulfochloride to be used must contain such groups, or care must be taken that in the course of the reaction part of the sulfochloride groups are saponified to yield sulfonic acid groups. If, however, the amine of the general Formula 4 which is applied contains solubilizing groups of the kind described above, phthalocyanine sulfochlorides that do not contain solubilizing groups may be used. It is, however, possible in order to further improve the solubility in water of the dyestuff formed to saponify also in this case for example part of the sulfochloride groups to obtain sulfonic acid groups.

The dyestuffs obtained according to the process of the present invention are isolated by salting out, for example with sodium or potassium chloride and/or by acidification with a mineral acid or by evaporation of the neutral, aqueous dyestuff solutions, preferably at a slightly elevated temperature and under reduced pressure.

The novel phthalocyanine dyestuffs obtainable according to the process of the invention are suitable for dyeing and printing various materials, for example wool, silk, leather, and linear polyamides. They are particularly appropriate for dyeing and printing cellulosic materials having a fibrous structure, for example linen, regenerated cellulose and particularly cotton. The dyestuffs are fixed on the cellulosic fiber by treating the material with an aqueous solution of the dyestuff in the presence of an acid-binding agent, for example sodium hydroxide, sodium bicarbonate or trisodium phosphate, or with a printing paste with the addition of an acid-binding agent. The dyestuff solutions or printing pastes may contain, besides acid-binding agents or substances being able to give off acid-binding agents, urea, urethanes or water-soluble amides of aliphatic carboxylic acids, for example formamide, acetamide or malonic acid diamide. The material may be treated with the acid-binding agent before, during or after the application of the dyestuff, if desired at higher temperatures. The dyestuffs obtainable according to the process of the invention may, of course, also be used for printing or dyeing cellulose-polyester mixed fabrics. The textile material is printed for this reason with a printing paste containing an acid-binding agent and water-soluble amides of aliphatic carboxylic acids or water-soluble urethanes and furthermore a finely dispersed dispersion dyestuff, and exposed to the action of dry heat at least at 100° C. after having dried.

The dyeings and prints obtained with the novel dyestuffs are distinguished by their pure blue to green shades, by their high color strength and by a very good fastness to light and particularly to wet processing.

The dyestuffs obtainable according to the process of the present invention are considerably superior to the dyestuffs of similar composition which are known from Belgian Patents No. 600,946 and 611,053 as regards the fastness to washing and particularly to boiling soda of the cotton dyes.

The following examples illustrate the invention the parts being by weight unless otherwise stated.

EXAMPLE 1

20.9 parts 3 - (N - β - cyanethyl - N - ethionylamino)-1-aminobenzene of the formula

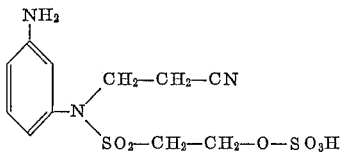

are dissolved in 200 parts water with the addition of 5 parts sodium bicarbonate until neutral reaction. 19.4 parts copper phthalocyanine-(3)-tetrasulfochloride are introduced into the solution obtained in the form of a moist paste, 2 parts pyridine are added and the mixture is stirred at 20°–25° C. The reaction mixture is maintained neutral by continually adding sodium bicarbonate. As soon as the reaction has stopped the solution obtained is filtered and the dyestuff formed is isolated by salting out with sodium chloride. After drying there are obtained 40.4 parts of a salt-containing blue dyestuff which is very readily soluble in water and which dyes wool and cotton in turquoise blue shades having very good fastness properties.

The 3-(N-β-cyanethyl-N-ethionylamino)-1-aminobenzene used for preparing the dyestuff described above may be prepared for example in the following manner:

1-amino-3-nitrobenzene is condensed with acrylonitrile in the presence of glacial acetic acid and copper acetate at 120° C.; the 3-(N-β-cyanethylamino)-1-nitrobenzene (melting point 97° C.) obtained is reacted with carbyl sulfate in nitrobenzene to yield 3-(N-β-cyanethyl-N-ethionylamino)-1-nitrobenzene, which, after reduction with iron yields the 3-(N-β-cyanethyl-N-ethionylamino)-1-aminobenzene of the above formula.

When replacing the 20.9 parts 3-(N-β-cyanethyl-N-ethionylamino)-1-aminobenzene by 23 parts 4-chloro-3-(N-β-cyanethyl-N-ethionylamino)-1-aminobenzene of the formula

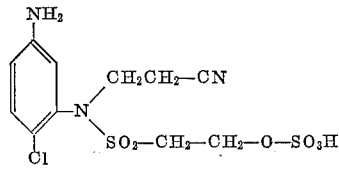

and when proceeding in the same manner as described above there is obtained a turquoise dyestuff having properties similar to those of the product described above.

EXAMPLE 2

14 parts 4-(N-β-cyanethyl-N-ethionylamino)-1-aminobenzene of the formula

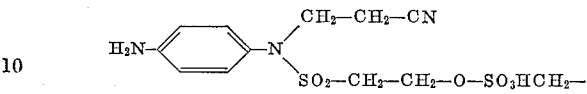

are dissolved in 150 parts water with the addition of 3.4 parts sodium bicarbonate. 9.7 parts copper phthalocyanine-(3)-tetrasulfochloride are introduced into the solution obtained in the form of a moist paste, and the reaction is carried on as described in Example 1. There is obtained a water-soluble dyestuff which dyes cotton in the presence of acid-binding agents for example sodium bicarbonate or sodium carbonate from salt-containing baths in turquoise blue shades having very good fastness to wet processing.

By replacing the copper phthalocyanine-(3)-tetrasulfochloride by the equivalent amount of the corresponding nickel derivative there is obtained a dyestuff having similar properties but being of a deeper green.

4-(N-β-cyanethyl-N-ethionylamino)-1-aminobenzene of the formula cited above may be prepared from 1-amino-4-nitrobenzene by the method for preparing 3-(N-β-cyanethyl-N-ethionylamino)-1-aminobenzene described in Example 1.

EXAMPLE 3

12.0 parts of the potassium salt of 5-(N-β-cyanethyl-N-ethionylamino)-2-methyl-1-aminobenzene of the formula

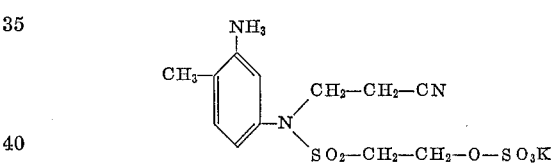

are dissolved in 200 parts water. While vigorously stirring 9.7 parts copper phthalocyanine-(3)-tetrasulfochloride are introduced into the solution obtained in the form of a moist paste and the reaction is carried on as described in Example 1. There are obtained 37 parts of a salt-containing turquoise blue dyestuff dyeing wool in turquoise blue shades having good fastness properties.

The 5-(N-β-cyanethyl-N-ethionylamino) - 2-methyl-1-aminobenzene used as starting material can be prepared for example in the following manner.

5-amino-2-methyl-1-nitrobenzene (melting point 79° C.) is condensed with acrylonitrile in the presence of glacial acetic acid and copper acetate at 120° C. to yield 5-(N-β-cyanethylamino)-2-methyl-1 - nitrobenzene (melting point 83°–85° C.). By reacting the cyano compound obtained with carbyl sulfate in nitrobenzene there is obtained 5-(N-β-cyanethyl-N-ethionylamino) - 2-methyl-1-nitrobenzene. This compound is transformed into 5-(N-β-cyanethyl-N-ethionylamino) - 2-methyl-1-aminobenzene by reduction with iron powder.

EXAMPLE 4

48.5 parts copper phthalocyanine-(3)-tetrasulfochloride are introduced in the form of a moist paste into a solution containing 60.9 parts of the potassium salt of 3-(N-carbomethoxy-methyl-N-ethionylamino)-1-aminobenzene of the formula

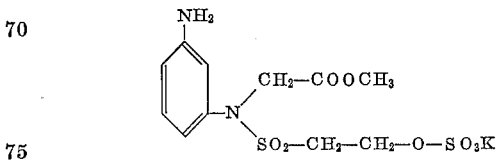

and 650 parts water while vigorously stirring. 5 parts pyridine are added and the mixture is stirred at room temperature while continually adding 23 parts sodium bicarbonate, so that a pH-value of 6.5 to 7 is maintained. As soon as the reaction is terminated and the pH-value remains constant without further adding sodium bicarbonate, the solution obtained is filtered and the dyestuff is isolated by salting out with sodium chloride. After drying 139 parts of a salt-containing water-soluble dyestuff which dyes wool and cotton in turquoise blue shades having good fastness properties are obtained.

By replacing copper phthalocyanine-(3)-tetrasulfochloride by the equal amount of copper phthalocyanine-(4)-tetrasulfochloride there is obtained a dyestuff having similar properties but which is of a redder hue than that described above.

The 3-(N-carbomethoxy-methyl-N - ethionylamino)-1-aminobenzene used for preparing the dyestuffs described above may be prepared for example in the following manner:

3-(N-carbomethoxy-methylamino-1-nitrobenzene (melting point 99°–101° C.) is reacted in nitrobenzene with carbyl sulfate. 3-(N-carbomethoxy-methyl - N-ethionylamino)-1-aminobenzene is obtained by catalytic hydrogenation of the 3-(N-carbomethoxy-methyl-N-ethionylamino)-1-nitrobenzene obtained in the presence of Raney nickel.

EXAMPLE 5

31.5 parts of the potassium salt of 4-(N-carbomethoxymethyl-N - ethionylamino) - 1-(4'-aminobenzoylamino)-benzene of the formula

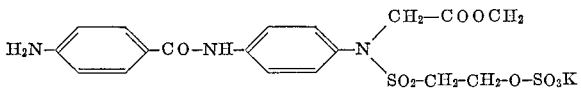

are dissolved in 500 parts water. At room temperature 19.4 parts copper phthalocyanine-(3)-tetrasulfochloride are introduced in the form of a moist paste into the solution obtained, while vigorously stirring, 2 parts pyridine are added, and the reaction is carried on as described in Example 1. There are obtained 82 parts of a salt-containing turquoise blue dyestuff suitable for dyeing and printing cotton fabrics in the presence of agents showing alkaline reaction. The dyes and prints obtained have very good fastness properties.

By replacing 4-(N-carbomethoxy-methyl-N-ethionylamino)-1-(4'-aminobenzoylamino)-benzene of the formula indicated above with an equal amount of 4-(N-carbomethoxy-methyl-N-ethionylamino) - 1-(3'-aminobenzoylamino)-benzene there is obtained a turquoise blue dyestuff having similar properties.

The amines used as starting products for the preparation of the dyestuffs described above may be prepared by reaction of 4-(N-carbomethoxy-methyl-N-ethionylamino)-1-aminobenzene (obtainable by the method described in Example 4) with 3- or 4-nitrobenzoylchloride and by catalytic hydrogenation of the nitro compound obtained in the presence of Raney nickel.

EXAMPLE 6

63 parts of the potassium salt of 3-(N-β-carbomethoxyethyl-N-ethionylamino)-1-aminobenzene of the formula

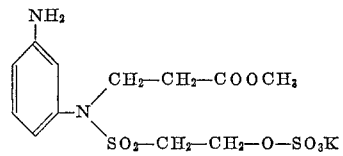

are dissolved in 630 parts water. 43.6 parts copper phthalocyanine-(3)-trisulfochloride are introduced in the form of a moist paste into the clear solution at 5°–10° C. while vigorously stirring, 5 parts pyridine are added and the mixture is stirred at 5°–10° C. The pH-value of the reaction mixture is maintained at 7–7.5 by adding sodium bicarbonate in portions. As soon as the reaction is terminated and no further sodium bicarbonate is consumed the solution formed is filtered and the dyestuff obtained is isolated by salting out with sodium chloride. After drying there are obtained 127 parts of a salt-containing, easily water-soluble dyestuff dyeing and printing cotton in turquoise blue shades having a very good fastness to wet processing.

There is obtained a dyestuff having similar properties by replacing copper phthalocyanine-(3)-trisulfochloride by the equivalent amount of cobalt phthalocyanine-(3)-trisulfochloride.

The 3-(N-β-carbomethoxy-ethyl-N-ethionylamino) - 1-aminobenzene having the formula indicated above which is used as starting material may be prepared by the following method:

1-amino-3-nitrobenzene is condensed with acrylic acid methyl ester in the presence of catalytic amounts of glacial acetic acid and copper acetate at 100° C. to yield 3-(N-β-carbomethoxy-ethylamino)-1-nitrobenzene (melting point 86°–87° C.). The ester thus obtained is transformed into nitrobenzene with carbyl sulfate and there is obtained 3-(N-β-carbomethoxy-ethyl-N-ethionylamino) - 1-nitrobenzene (melting point of the potassium salt: 120° C. with decomposition). 3-(N-β-carbomethoxy-ethyl-N-ethionylamino)-1-aminobenzene is obtained by catalytic reduction of this compound in the presence of Raney nickel.

EXAMPLE 7

While vigorously stirring 9.7 parts copper phthalocyanine-(3)-tetrasulfochloride are slowly introduced in the form of a moist paste into a solution of 5 parts 3-(N-β cyanethyl-N-vinyl-sulfonylamino)-1-aminobenzene of the formula

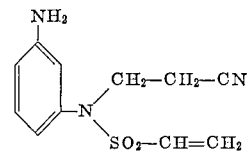

in 30 parts pyridine and 50 parts water at 0° to 5° C. The reaction mixture is stirred for 6 hours at 5° C. and for further 6 hours at 15° to 20° C. Then it is poured into a mixture of 50 parts hydrochloric acid (d.=1.15) and 50 parts ice and the dyestuff separated is filtered. The moist filter cake is stirred with little water and neutralized by the addition of sodium bicarbonate. Then the dyestuff is filtered off, if desired after the addition of sodium chloride, and dried. 21 parts of a turquoise blue dyestuff are obtained which dyes cotton fabrics from dyeing baths containing alkali in turquoise blue shades having very good fastness to washing.

The 3-(N-β - cyanethyl - N - vinyl - sulfonylamino) - 1-aminobenzene (melting point 75°–77° C.) used as starting material may be prepared by treating 3-(N-β-cyanethyl-N-ethionylamino)-1-aminobenzene prepared according to the method described in Example 1 with diluted sodium hydroxide solution at room temperature.

The same dyestuff is obtained by reacting 9.7 parts copper phthalocyanine-(3)-tetrasulfochloride in the way described in Example 1 with 7 parts 3-(N-β-cyanethyl-N-ethionylamino)-1-aminobenzene of the formula

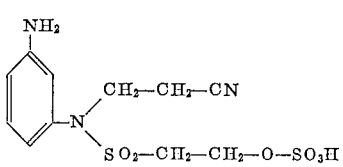

by treating the dyestuff solution obtained with diluted sodium hydroxide solution at room temperature and by isolating the dyestuff by salting out.

EXAMPLE 8

59.4 parts of the potassium salt of 4-(N-β-chlorethyl-N-ethionylamino)-1-aminobenzene of the formula

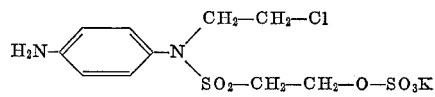

are dissolved in 500 parts water. While vigorously stirring 48.5 parts copper phthalocyanine-(3)-tetrasulfochloride are introduced into this solution in the form of a moist paste at 5° to 10° C. 5 parts pyridine are added and the reaction is carried on as described in Example 6. There are obtained 127 parts of a salt-containing turquoise blue dyestuff which dyes cotton fabrics in the presence of acid-binding agents, for example sodium bicarbonate and sodium carbonate, in turquoise blue shades having very good fastness to wet processing.

The same dyestuff may be prepared by reacting 41.6 parts 4-(N-β-chlorethyl-N-isethionylamino) - 1 - amino benzene of the formula

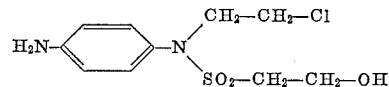

with copper phthalocyanine-(3)-tetrasulfochloride in the manner described in Example 7 and by transforming the dyestuff first obtained into the acid sulfuric acid ester with sulfuric acid.

The 4-(N-β-chlorethyl-N-ethionylamino)-1-aminobenzene used for preparing the dyestuff described above may be prepared in the following manner: 1-chloro-4-nitrobenzene is transformed with ethanolamine in pyridine into 4-(N-β-hydroxyethylamino)-1-nitrobenzene (fusing point 110° C.) at 130° to 140° C. This compound is transformed into 4-(N-β-chlorethylamino) - 1 - nitrobenzene (melting point 87° C.) by means of thionylchloride in benzene. By reaction with carbyl sulfate in nitrobenzene there is obtained 4-(N-β-chlorethyl-N-ethionylamino)-1-nitrobenzene which is transformed into 4-(N-β-chlorethyl-N-ethionylamino)-1-aminobenzene by catalytic hydrogenation in the presence of Raney nickel.

By replacing the 59.4 parts of the potassium salt of 4 - (N - β - chlorethyl - N - ethionylamino) - 1 - aminobenzene by 61.5 parts of the compound having the formula

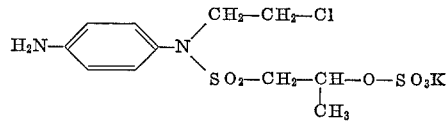

and by carrying on the reaction as described above there is obtained a turquoise blue dyestuff having similar properties.

EXAMPLE 9

88 parts tetraphenyl copper phthalocyanine are introduced into 475 parts chlorosulfonic acid and stirred for 16 hours at 100° C. After cooling to 90° C. 200 parts thionyl chloride are slowly introduced dropwise at 80° to 90° C. Subsequently the reaction mixture is further stirred for 4 hours at 90° C. Then it is cooled, introduced into ice while stirring, and the tetraphenyl copper phthalocyanine sulfochloride separated is filtered off and washed neutral with ice water. While vigorously stirring the moist filtering residue is slowly introduced into a solution of 155 parts of the potassium salt of 3-(N-β-cyanethyl-N-ethiolamino)-1-aminobenzene in 1000 parts water at 15° to 20° C. 5 parts pyridine are added and the mixture is stirred at 15° to 20° C. The reaction mixture is maintained neutral by continually adding sodium bicarbonate. As soon as the condensation is terminated the water-soluble dyestuff formed is isolated by salting out with sodium chloride. There are obtained after drying 455 parts of a salt-containing green dyestuff suitable for dyeing and printing cellulose fibers in green shades having good fastness to wet processing.

EXAMPLE 10

9.7 parts copper phthalocyanine-(3)-tetrasulfochloride are introduced in the form of a moist paste at 10° to 15° C. into a solution of 13.6 parts of the potassium salt of 3-(N - β - cyanethyl-N-ethionylamino)-2'-methyl-4'-amino-1,1'-azobenzene of the formula

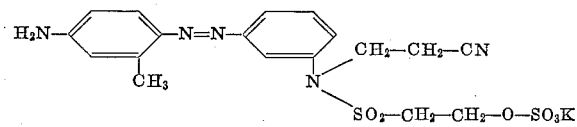

in 250 parts water while vigorously stirring. The reaction is carried on as described in Example 1. There are obtained 35 parts salt-containing dyestuff which is dissolved in water in green shades and which is suitable for dyeing and printing cotton fabrics.

The 3-(N-β-cyanethyl-N-ethionylamino)-2'-methyl-4'-amino-1,1'-azobenzene of the above formula used as starting material may be prepared by diazotizing 3-(N-β-cyanethyl-N-ethionylamino)-1-aminobenzene being prepared according to the method described in Example 1 and by coupling it in acid solution with 1-amino-3-methylbenzene.

We claim:
1. water-soluble phthalocyanine dyestuff having a formula selected from the group consisting of

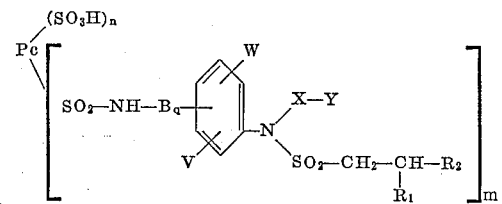

and

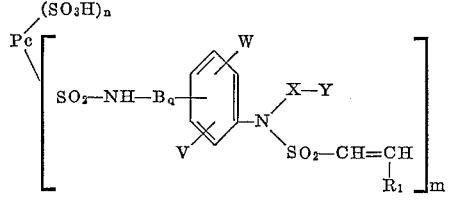

wherein Pc represents a member of the group consisting of copper-phthalocyanine, nickel-phthalocyanine, cobalt-phthalocyanine and tetraphenyl-copper-phthalocyanine, B represents a bivalent organic radical selected from the group consisting of lower alkylene, lower alkylene-imino, lower alkylene-lower-alkylimino,

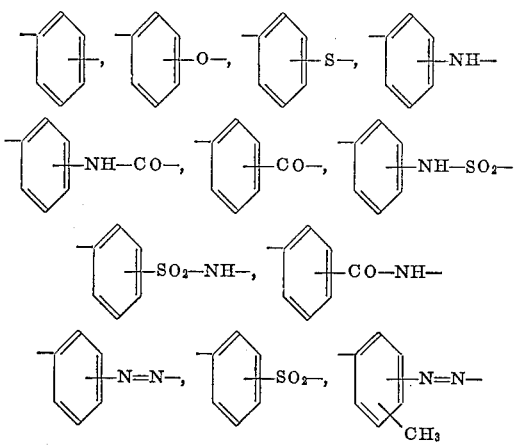

and

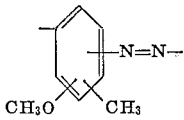

$q$ means an integer of 0 and 1, X represents a bivalent radical selected from the group consisting of straight and branched lower alkylene, Y stands for a member selected from the group of chlorine, bromine, hydroxyl, cyano, formyl, lower alkoxy, carboxylic acid, carboxamide, carboxylic acid lower alkyl ester, lower dialkylamino, lower alkylsulphone, sulfonic acid and sulfato, V and W represent members of the group consisting of hydrogen, lower alkyl and lower alkoxy, $R_1$ represents a member selected from the group consisting of hydrogen and lower alkyl, $R_2$ means a radical selected from the group consisting of chlorine, bromine, sulfato and O-acetyl, $m$ stands for a number of 1 to 4 and $n$ for a number of 0 to 3, the sum of $m$ and $n$ being 4.

2. The water-soluble phthalocyanine dyestuff of the formula

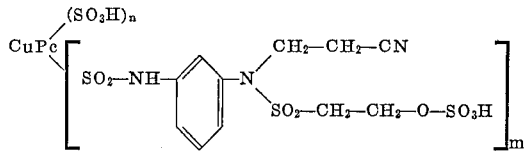

wherein $m$ represents a number of 1 to 4 and $n$ a number of 0 to 3 the sum of $m$ and $n$ being 4.

3. The water-soluble phthalocyanine dyestuff of the formula

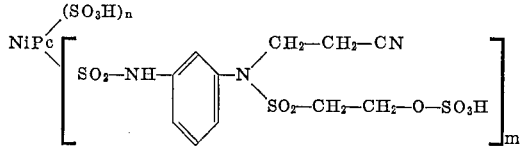

wherein $m$ represents a number of 1 to 4 and $n$ a number of 0 to 3, the sum of $m$ and $n$ being 4.

4. The water-soluble phthalocyanine dyestuff of the formula

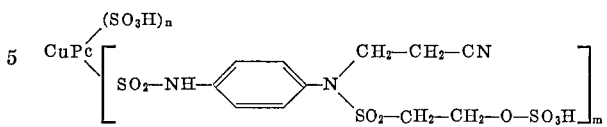

wherein $m$ represents a number of 1 to 4 and $n$ a number of 0 to 3, the sum of $m$ and $n$ being 4.

5. The water-soluble phthalocyanine dyestuff of the formula

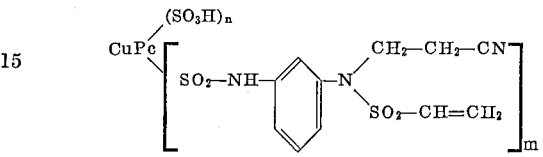

wherein $m$ represents a number of 1 to 4 and $n$ a number of 0 to 3, the sum of $m$ and $n$ being 4.

6. The water-soluble phthalocyanine dyestuff of the formula

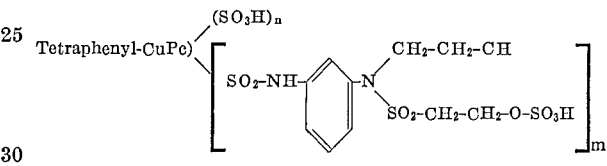

wherein $m$ represents a number of 1 to 4, $n$ a number of 0 to 3, the sum of $m$ and $n$ being 4.

References Cited by the Examiner
UNITED STATES PATENTS
2,300,572  11/1942  Hoyer et al. _____ 260—314.5

WALTER A. MODANCE, *Primary Examiner.*

JOHN D. RANDOLPH, *Examiner.*

JAMES A. PATTEN, *Assistant Examiner.*